United States Patent
Ohma et al.

(10) Patent No.: US 8,026,018 B2
(45) Date of Patent: Sep. 27, 2011

(54) ELECTROLYTE MEMBRANE-ELECTRODE ASSEMBLY AND PRODUCTION METHOD THEREOF

(75) Inventors: Atsushi Ohma, Yokohama (JP); Yozo Okuyama, Yokosuka (JP); Yasuhiro Numao, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 869 days.

(21) Appl. No.: 12/064,989

(22) PCT Filed: Aug. 17, 2006

(86) PCT No.: PCT/JP2006/316143
§ 371 (c)(1),
(2), (4) Date: Feb. 27, 2008

(87) PCT Pub. No.: WO2007/026546
PCT Pub. Date: Mar. 8, 2007

(65) Prior Publication Data
US 2009/0104507 A1  Apr. 23, 2009

(30) Foreign Application Priority Data
Aug. 31, 2005  (JP) .................................. 2005-252660

(51) Int. Cl.
*H01M 2/08* (2006.01)
*H01M 4/86* (2006.01)
*B32B 37/12* (2006.01)

(52) U.S. Cl. ........... 429/508; 429/460; 429/535; 156/60
(58) Field of Classification Search .................. 429/460, 429/508
See application file for complete search history.

(56) References Cited

U.S. PATENT DOCUMENTS

| | | |
|---|---|---|
| 6,316,139 B1 | 11/2001 | Uchida et al. |
| 2003/0127806 A1 | 7/2003 | Belchuk |
| 2004/0128825 A1* | 7/2004 | Belchuk ...................... 29/623.1 |
| 2005/0100776 A1 | 5/2005 | Brunk et al. |
| 2005/0123819 A1 | 6/2005 | Hiroi et al. |
| 2005/0181267 A1 | 8/2005 | Mitsuta et al. |

FOREIGN PATENT DOCUMENTS

| | | |
|---|---|---|
| JP | 11-219714 A | 8/1999 |
| JP | 2002-324556 A | 11/2002 |
| JP | 2003-68319 A | 3/2003 |
| JP | 2004-172095 A | 6/2004 |
| JP | 2005-158690 A | 6/2005 |
| WO | WO 02/25753 A1 | 3/2002 |

* cited by examiner

*Primary Examiner* — Patrick Ryan
*Assistant Examiner* — Brent Thomas
(74) *Attorney, Agent, or Firm* — Foley & Lardner LLP

(57) ABSTRACT

An electrolyte membrane-electrode assembly of the present invention includes: an electrolyte membrane; an anode-side electrode including an anode-side catalyst layer disposed on one side of the electrolyte membrane and an anode-side gas diffusion layer formed on the anode-side catalyst layer beyond a surface-direction end of the anode-side catalyst layer; an anode-side adhesive layer disposed on at least a part of a periphery of the anode-side catalyst layer; and an anode-side gasket layer disposed in contact with the anode-side adhesive layer, wherein a surface-direction inner end of the anode-side adhesive lay is located inside beyond a surface-direction inner end of the anode-side gasket layer, and a part of the anode-side adhesive layer is located to overlap with a part of the anode-side gas diffusion layer with respect to a thickness direction. Further, on the other side of the electrolyte membrane, cathode-side respective layers having the same constructions as above are disposed.

14 Claims, 6 Drawing Sheets

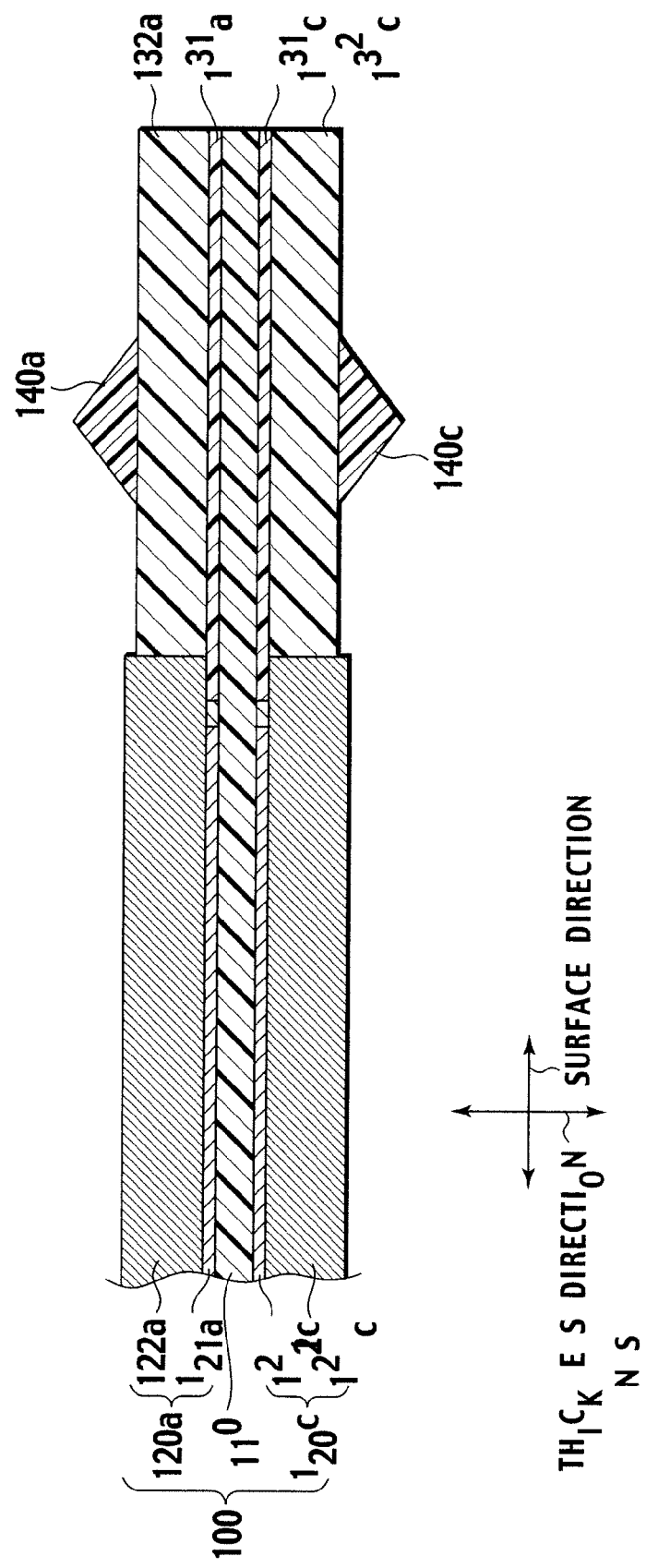

ELECTROLYTE MEMBRANE-ELECTRODE ASSEMBLY AND PRODUCTION METHOD THEREOF

TECHNICAL FIELD

The present invention relates to an electrolyte membrane-electrode assembly and a production method thereof, and more specifically, relates to an electrolyte membrane-electrode assembly in which durability is enhanced, and to a production method thereof.

BACKGROUND ART

In recent years, a fuel cell capable of operating even at room temperature and obtaining a high output density has attracted attention as a power supply for an electric vehicle and a stationary power supply in response to social demand and trend against a backdrop of energy/environmental problems. In the fuel cell, a product generated by an electrode reaction is water in theory, and the fuel cell is a clean power generation system that hardly affects the terrestrial environment. In particular, a polymer electrolyte fuel cell operates at a relatively low temperature, and accordingly, has been expected as the power supply for the electric vehicle.

In general, the polymer electrolyte fuel cell includes a single cell in which a membrane electrode assembly (MEA) is sandwiched between separators on which gas flow passages and the like are formed. The electrolyte membrane-electrode assembly is one formed by disposing electrodes having catalyst layers and gas diffusion layers on both surfaces of a polymer electrolyte membrane. Ends of the electrolyte membrane in a surface direction protrude from ends of the electrodes in the surface direction to the outside. And, on such protrusions of the electrolyte membrane, gasket layers having a gas sealing function are provided in order to prevent gas leakage to the electrodes opposite thereto or gas leakage to the outside.

In the conventional polymer electrolyte fuel cell, in some case, a clearance has occurred between each of the separators and each of the gasket layers, and fuel or oxidant gas has leaked therefrom, whereby performance of the fuel cell has been decreased, and intimate contact property between each of the separators and each of the electrodes cannot be ensured sufficiently, resulting in that desired power generation characteristics are not exerted. In this connection, in Japanese Patent Unexamined Publication No. 2002-324556, there has been disclosed a single cell in which an electrolyte membrane-electrode assembly having gasket layers is sandwiched by separators, wherein a thickness of the gasket layers before being sandwiched by the separators is made thinner than a thickness of electrodes.

DISCLOSURE OF INVENTION

In the polymer electrolyte fuel cell, in order to reduce electrical contact resistance of constituent parts such as a bipolar plate, it is necessary to constantly tighten the entirety of the fuel cell. For this purpose, it is effective to stack a plurality of the single cells in one direction, to arrange end plates on both ends of the single cells, and to fix the two end plates to each other by using fastening members. Moreover, in order to enhance bonding characteristics of the respective layers in the electrolyte membrane-electrode assembly, hot press and the like have been used for performing bonding for the electrolyte membrane-electrode assembly.

By fastening pressures when the fuel cell is assembled as well as when the hot press is performed at the time of the bonding as described above, a pressure is constantly applied to the single cells constituting the fuel cell. Therefore, there has been a problem that each electrolyte membrane is particularly prone to be subjected to deterioration with time by the pressure, resulting in that durability of the fuel cell is decreased.

The present invention has been made in order to solve the above-described problem. It is an object of the present invention to provide an electrolyte membrane-electrode assembly in which durability is enhanced by preventing the deterioration of the electrolyte membrane, which is caused by the pressure at the time of the hot press, the fastening, and so on.

Then, as a result of an assiduous study by the inventors of the present invention in consideration for the above-described problem, it has been found out that the deterioration of the electrolyte membrane by the pressure at the time of the hot press, the fastening, and so on is prone to occur in spots where the respective layers are adjacent to one another in the surface direction of the electrolyte membrane-electrode assembly. Specifically, what has been found out is that: the pressure at the time of the hot press, the fastening, and so on is likely to concentrate on boundary spots where the respective layers are adjacent to one another in the surfaces of the single cell, and in particular, boundary spots where the gas diffusion layers and the gasket layers are adjacent to each other, and the like; the thickness of the electrolyte membrane is changed by the concentrated pressure; and such a problem that the electrolyte membrane is perforated occurs depending on the case.

When the electrolyte membrane is perforated, hydrogen supplied to an anode and the oxidant gas supplied to a cathode react with each other, and an amount of the hydrogen, which is utilized effectively, is reduced. Moreover, such an anode-side electrode and such a cathode-side electrode contact each other to cause a minute short circuit, whereby local heat generation occurs, resulting in that the decrease of the durability of the fuel cell is brought about.

Hence, in order to prevent the deterioration of the electrolyte membrane, which is caused by the pressure at the time of the hot press, the fastening, and so on, it is effective to absorb the pressure locally applied to the electrolyte membrane. In this connection, the inventors of the present invention have found out that, in the electrolyte membrane-electrode assembly of the present invention, adhesive layers for fixing the gasket layers are disposed so as to be also located under the gas diffusion layers, whereby the pressure to the adhesive layers are partially dispersed even if the pressure is locally applied to the electrolyte membrane, and rupture of the electrolyte membrane is prevented.

An electrolyte membrane-electrode assembly according to a first aspect of the present invention includes: an electrolyte membrane; an anode-side electrode comprising an anode-side catalyst layer and an anode-side gas diffusion layer formed on the anode-side catalyst layer, the anode-side electrode being disposed on one side of the electrolyte membrane; a cathode-side electrode comprising a cathode-side catalyst layer and a cathode-side gas diffusion layer formed on the cathode-side catalyst layer, the cathode-side electrode being disposed on the other side of the electrolyte membrane; an anode-side adhesive layer disposed on at least a part of a periphery of the anode-side catalyst layer on the electrolyte membrane; a cathode-side adhesive layer disposed on at least a part of a periphery of the cathode-side catalyst layer on the electrolyte membrane; a cathode-side gasket layer disposed in contact with the cathode-side adhesive layer; and an anode-side gasket layer disposed in contact with the anode-side adhesive layer, wherein a surface-direction end of the anode-side gas diffusion layer is located more on the anode-side gasket layer side than a surface-direction end of the anode-side catalyst layer is, and further, a surface-direction end of the cathode-side gas diffusion layer is located more on the cathode-side gasket layer side than a surface-direction end of the cathode-side catalyst layer is, a surface-direction inner end of the anode-side adhesive layer is located more inside than a surface-direction inner end of the anode-side gasket layer is with respect to a surface direction of the electrolyte membrane-electrode assembly, and further, a part of the anode-side adhesive layer is located to overlap with a part of the anode-side gas diffusion layer with respect to a thickness direction of the electrolyte membrane-electrode assembly, and a surface-direction inner end of the cathode-side adhesive layer is located more inside than a surface-direction inner end of the cathode-side gasket layer is with respect to the surface direction of the electrolyte membrane-electrode assembly, and further, a part of the cathode-side adhesive layer is located to overlap with a part of the gas diffusion layer with respect to the thickness direction of the electrolyte membrane-electrode assembly.

A method for producing an electrolyte membrane-electrode assembly according to a second aspect of the present invention includes: (A) forming an anode-side catalyst layer on one side of an electrolyte membrane, and a cathode-side catalyst layer on the other side; (B) forming an anode-side adhesive layer and an anode-side gasket layer on at least a part of a periphery of the anode-side catalyst layer on the electrolyte membrane, and a cathode-side adhesive layer and a cathode-side gasket layer on a periphery of the cathode-side catalyst layer on the electrolyte membrane; and (C) forming an anode-side gas diffusion layer on the anode-side catalyst layer, and a cathode-side gas diffusion layer on the cathode-side catalyst layer, wherein a surface-direction inner end of the anode-side adhesive layer is formed to be located more inside than a surface-direction inner end of the anode-side gasket layer is with respect to a surface direction of the electrolyte membrane, and further, a part of the anode-side adhesive layer is formed to overlap with a part of the anode-side gas diffusion layer with respect to a thickness direction of the electrolyte membrane, and a surface-direction inner end of the cathode-side adhesive layer is formed to be located more inside than a surface-direction inner end of the cathode-side gasket layer is with respect to the surface direction of the electrolyte membrane, and further, a part of the cathode-side adhesive layer is formed to overlap with a part of the cathode-side gas diffusion layer with respect to the thickness direction of the electrolyte membrane.

BRIEF DESCRIPTION OF DRAWINGS

FIG. 6 is a cross-sectional view showing an electrolyte membrane-electrode assembly in the present invention, on which sealing protrusions are further formed.

BEST MODE FOR CARRYING OUT THE INVENTION

A description will be made below in detail of embodiments of an electrolyte membrane-electrode assembly and a production method thereof according to the present invention based on the drawings.

Figure 1:
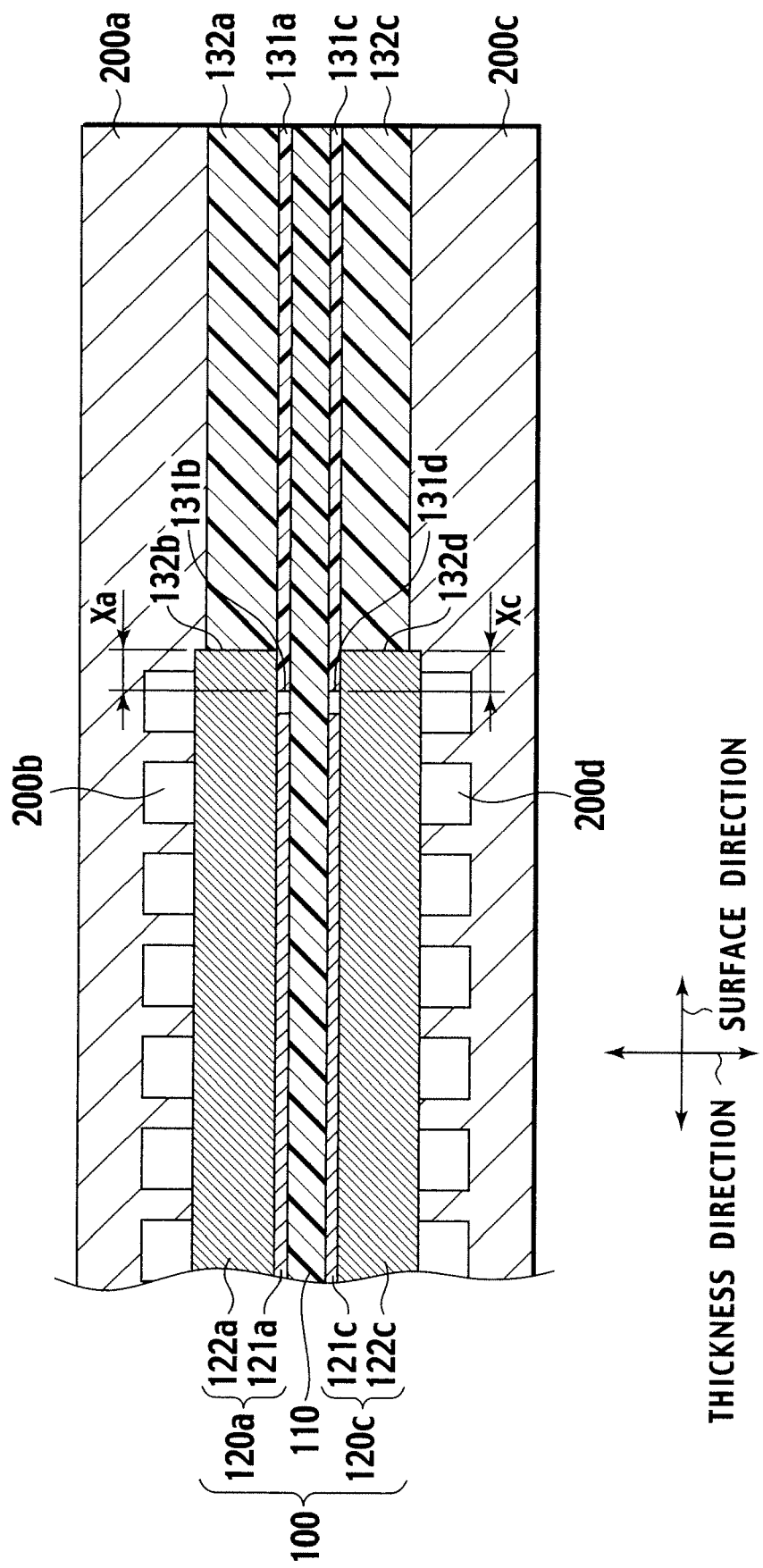
FIG. 1 is a cross-sectional view showing an example of an electrolyte membrane-electrode assembly in the present invention.

FIG. 1 shows a cross section of an end portion in the electrolyte membrane-electrode assembly of the present invention. In the electrolyte membrane-electrode assembly 100 shown in FIG. 1, an anode-side electrode 120a including an anode-side catalyst layer 121a and an anode-side gas diffusion layer 122a is disposed on one surface of an electrolyte membrane 110. Meanwhile, on the other surface of the electrolyte membrane 110, a cathode-side electrode 120c including a cathode-side catalyst layer 121c and a cathode-side gas diffusion layer 122c is disposed. Moreover, ends of the anode-side gas diffusion layer 122a and the cathode-side gas diffusion layer 122c in a direction of the respective surfaces are arranged more on gasket layers 132a and 132c side than ends of the anode-side catalyst layer 121a and the cathode-side catalyst layer 121c in a direction of the respective surfaces are.

On at least a part of a periphery of the anode-side catalyst layer 121a on the electrolyte membrane 110, an anode-side adhesive layer 131a is disposed, and further, the anode-side gasket layer 132a is disposed in contact with the anode-side adhesive layer 131a. Meanwhile, on at least a part of a periphery of the cathode-side catalyst layer 121c on the electrolyte membrane 110, a cathode-side adhesive layer 131c is disposed, and further, the cathode-side gasket layer 132c is disposed in contact with the cathode-side adhesive layer 131c.

Then, the electrolyte membrane-electrode assembly 100 and the anode-side and cathode-side gasket layers 132a and 132c are sandwiched by a pair of separators 200a and 200c. On the separator 200a, a fuel gas flow passage 200b is provided. And, through the fuel gas flow passage 200b, fuel gas ($H_2$ or the like) is supplied to the gas diffusion layer 122a and the anode-side catalyst layer 121a. Meanwhile, on the separator 200c, an oxidant gas flow passage 200d is provided. And, through the oxidant gas flow passage 200d, oxidant gas (air, $O_2$ or the like) is supplied to the gas diffusion layer 122c and the cathode-side catalyst layer 121c. Note that, in FIG. 2 and after, the separators 200a and 200c will be omitted.

In the electrolyte membrane-electrode assembly 100 having such a configuration, an inner end 131b of the anode-side adhesive layer 131a in the surface direction is located inside of the electrolyte membrane-electrode assembly 100 in the surface direction beyond an inner end 132b of the anode-side gasket layer 132a in the surface direction. And, a part of the anode-side adhesive layer 131a, which protrudes from the anode-side gasket layer 132a, is located so as to overlap with a part of the anode-side gas diffusion layer 122a in a thickness direction.

Moreover, in the electrolyte membrane-electrode assembly 100, an inner end 131d of the cathode-side adhesive layer 131c is located inside of the electrolyte membrane-electrode assembly 100 in the surface direction beyond an inner end 132d of the cathode-side gasket layer 132c in the surface direction, and a part of the cathode-side adhesive layer 131c, which protrudes from the cathode-side gasket layer 132c, is located so as to overlap with a part of the cathode-side gas diffusion layer 122c in the thickness direction.

The adhesive layers 131a and 131c, which are arranged on the anode side and the cathode side, respectively, are ones for fixing the gasket layers 132a and 132c to the electrolyte membrane-electrode assembly 100. The electrolyte membrane-electrode assembly 100 of the present invention is characterized in that, as described above, the respective adhesive layers 131a and 131c, which are arranged on the anode side and the cathode side, respectively, are at least partially protruded from the gasket layer 132a and 132c, respectively, toward the inside of the electrolyte membrane-electrode assembly 100 in the surface direction. In such a way, stresses locally applied to the electrolyte membrane-electrode assembly 100 from boundary spots where the gas diffusion layers 122a and 122c and the gasket layers 132a and 132c are adjacent to each other can be absorbed. Moreover, deterioration of the electrolyte membrane-electrode assembly 100, which is caused by local concentration of a pressure at the time of hot press, fastening, and so on, can be prevented, thus making it possible to enhance durability of the electrolyte membrane-electrode assembly 100.

Moreover, it becomes possible to partially adhere the protruding spots of the respective anode-side and cathode-side adhesive layers 131a and 131c and the gas diffusion layers 122a and 122c to each other. Accordingly, the gas diffusion layers 122a and 122c can be integrated with the electrolyte membrane-electrode assembly 100, and handling easiness and assembling easiness of the electrolyte membrane-electrode assembly 100 are enhanced. In such a way, it becomes possible to omit or simplify the hot press for enhancing adhesion property between the gas diffusion layers 122a and 122c and the electrolyte membrane-electrode assembly 100, whereby the deterioration of the electrolyte membrane 110, which is caused by the pressure of the hot press, can be prevented.

Furthermore, heretofore, it has been difficult to completely bring the gas diffusion layers 122a and 122c and the gasket layers 132a and 132c into intimate contact with each other, and accordingly, there has been a problem that the fuel gas and the oxidant gas directly contact the electrolyte membrane 110, thereby accelerating the deterioration of the electrolyte membrane 110. However, in the present invention, the gas-impermeable adhesive layers 131a and 131c are used, thus also making it possible to prevent such a problem. Hence, in accordance with the present invention, it becomes possible to provide the electrolyte membrane-electrode assembly 100 in which the durability, the handling easiness and the assembling easiness are enhanced.

A description will be sequentially made below in detail of the electrolyte membrane-electrode assembly 100 of the present invention.

In the electrolyte membrane-electrode assembly 100 of the present invention, with respect to the surface direction of the electrolyte membrane-electrode assembly 100, the inner end 131b of the anode-side adhesive layer 131a in the surface direction is located inside beyond the inner end 132b of the anode-side gasket layer 132a in the surface direction, and further, with respect to the thickness direction of the electrolyte membrane-electrode assembly 100, a part of the anode-side adhesive layer 131a is located so as to overlap with a part of the anode-side gas diffusion layer 122a. Moreover, with respect to the surface direction of the electrolyte membrane-electrode assembly 100, the inner end 131d of the cathode-side adhesive layer 131c in the surface direction is located inside beyond the inner end 132d of the cathode-side gasket layer 132c in the surface direction, and further, with respect to the thickness direction of the electrolyte membrane-electrode assembly 100, a part of the cathode-side adhesive layer 131c is located so as to overlap with a part of the cathode-side gas diffusion layer 122c.

Note that the following description will be made while blanketing descriptions of the catalyst layers 121a and 121c, the adhesive layers 131a and 131c, the gasket layers 132a and 132c, and the like, which are used in the cathode and the anode, unless otherwise specified.

In the present invention, "the inner ends 131b and 131d of the adhesive layers 131a and 131c in the surface direction" stand for surface-direction ends of the adhesive layers 131a and 131c arranged in contact with the electrolyte membrane-electrode assembly 100, the surface-direction ends being located inside of the electrolyte membrane-electrode assembly 100, and being located in the vicinities of the ends of the catalyst layers 121a and 121c. Meanwhile, "the ends 132b and 132d of the gasket layers 132a and 132c in the surface direction" stand for ends of the gasket layers 132a and 132c arranged in contact with the adhesive layers 131a and 131c, the ends being located inside of the electrolyte membrane-electrode assembly 100. Moreover, "the inside" in this specification stands for a center side of the electrolyte membrane-electrode assembly in the thickness direction or the surface direction.

In the electrolyte membrane-electrode assembly 100 of the present invention, the adhesive layers 131a and 131c protruding from the gasket layers 132a and 132c are partially brought into contact with the gas diffusion layers 122a and 122c, respectively. However, it is preferable that all the spots of the adhesive layers 131a and 131c protruding from the gasket layers 132a and 132c be brought into contact with the gas diffusion layers 122a and 122c.

A width by which the adhesive layers 131a and 131c protruding from the gasket layers 132a and 132c partially overlap with the gas diffusion layers 122a and 122c is recommended to be preferably 0.1 to 10 mm, more preferably, 0.1 to 5 mm, and particularly preferably, 0.5 to 3 mm. Specifically, it is recommended that a width shown by arrows Xa or a width shown by arrows Xc in FIG. 1 be set within the above-described range. In such a way, the stresses to the electrolyte membrane 110 can be absorbed more surely, and damage on the electrolyte membrane 110 can be prevented.

Figure 2:
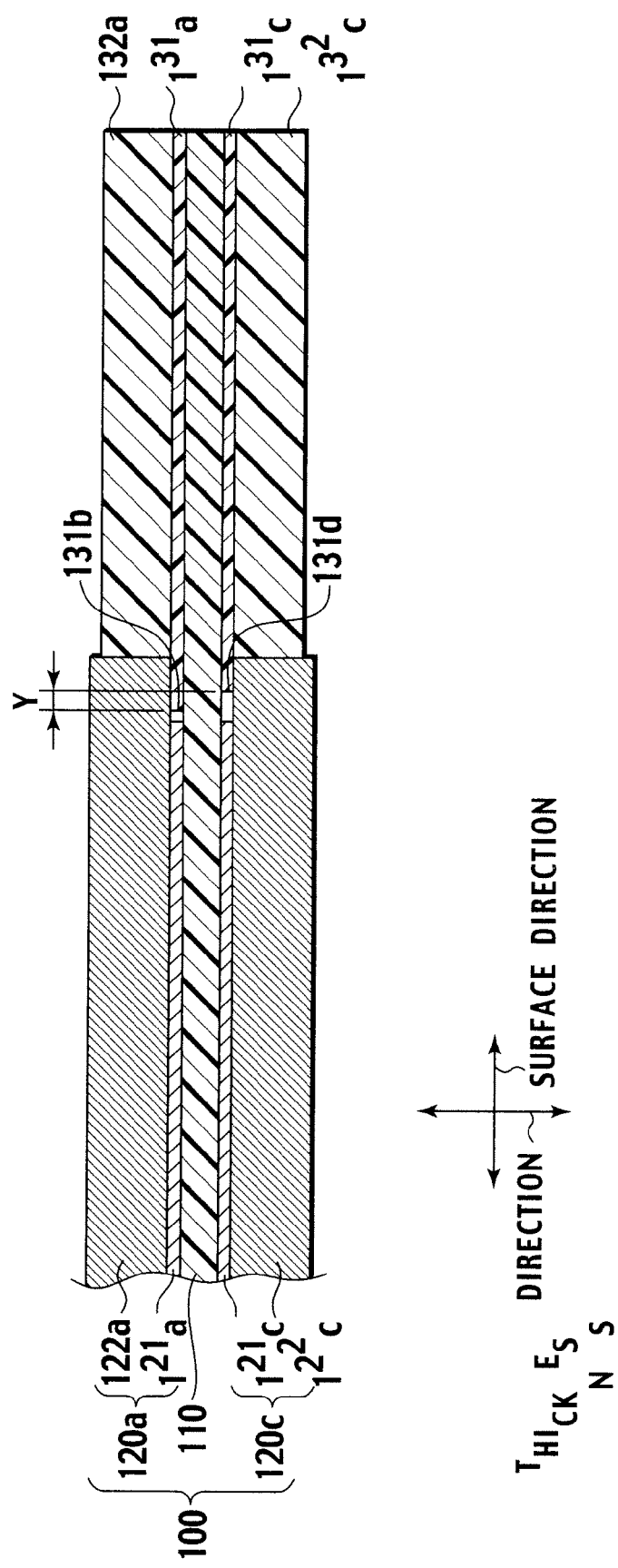
FIG. 2 is a cross-sectional view showing another example of the electrolyte membrane-electrode assembly in the present invention.

Moreover, as shown in FIG. 2, it is preferable that the electrolyte membrane-electrode assembly 100 of the present invention have a configuration in which the surface-direction inner end 131b of the anode-side adhesive layer 131a and the surface-direction inner end 131d of the cathode-side adhesive layer 131c are terminated at positions different with respect to the thickness direction of the electrolyte membrane-electrode assembly 100. As described above, the deterioration of the electrolyte membrane 110, which is caused by the pressure at the time of the hot press, the fastening, and so on, is prone to occur at the spots where the respective layers are adjacent to one another in the thickness direction of the electrolyte membrane 110. Hence, in order to prevent the deterioration of the electrolyte membrane 110 more surely, it is preferable to reduce the spots where the surface-direction ends of the respective layers overlap with one another also in the thickness direction of the electrolyte membrane-electrode assembly 100. Accordingly, the electrolyte membrane-electrode assembly 100 has the above-described configuration, thus making it possible to absorb the pressure locally applied to the electrolyte membrane 110.

At this time, with respect to the surface direction of the electrolyte membrane-electrode assembly 100, the surface-direction inner end 131b of the anode-side adhesive layer 131a may be terminated inside beyond the surface-direction inner end 131d of the cathode-side adhesive layer 131c. Alternatively, the surface-direction inner end 131d of the cathode-side adhesive layer 131c may be terminated inside beyond the surface-direction inner end 131b of the anode-side adhesive layer 131a with respect to the surface direction. However, though will be described later, it is preferable to enhance the durability of the electrolyte membrane-electrode assembly 100 by increasing a size of the anode-side catalyst layer 121a more than that of the cathode-side catalyst layer 121c, and accordingly, it is preferable that the surface-direction inner end 131d of the cathode-side adhesive layer 131c be terminated inside beyond the surface-direction inner end 131b of the anode-side adhesive layer 131a with respect to the surface direction.

It is recommended to set a gap between the surface-direction inner end 131b of the anode-side adhesive layer 131a and the surface-direction inner end 131d of the cathode-side adhesive layer 131c at preferably about 0.1 to 10 mm, and more preferably, about 0.5 to 3 mm. Specifically, it is recommended that a width shown by arrows Y in FIG. 2 be set within the above-described range. In such a way, the pressure to the electrolyte membrane 110 can be absorbed.

In the electrolyte membrane-electrode assembly 100 of the present invention, in the thickness direction of the electrolyte membrane-electrode assembly 100, the spots where the ends of the respective layers overlap with one another are reduced, whereby the pressure to the electrolyte membrane 110 is absorbed. Therefore, it is preferable that the surface-direction end of the anode-side catalyst layer 121a and the surface-direction end of the cathode-side catalyst layer 121c not overlap with each other with respect to the thickness direction of the electrolyte membrane-electrode assembly 100. Hence, in order to compose the electrolyte membrane-electrode assembly 100 having such a configuration, it is preferable to increase the size of either one of the anode-side catalyst layer 121a and the cathode-side catalyst layer 121c more than the size of the other. Moreover, in the electrolyte membrane-electrode assembly 100 of the present invention, it is preferable that the surface-direction end of the anode-side catalyst layer 121a or the cathode-side catalyst layer 121c, which is smaller in size, be located more inside than the surface-direction end of the other is with respect to the surface direction of the electrolyte membrane-electrode assembly 100.

Figure 3:
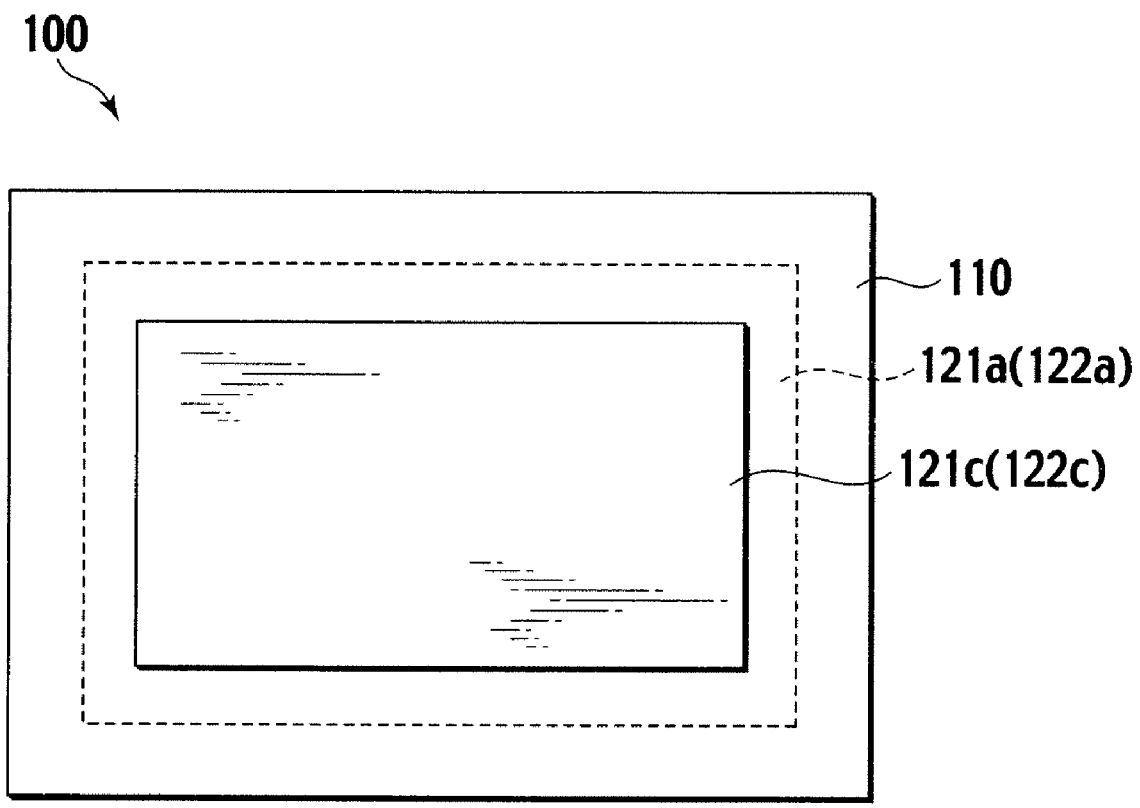
FIG. 3 is a plan view showing the electrolyte membrane-electrode assembly in the present invention, explaining a positional relationship between an anode-side catalyst layer and a cathode-side catalyst layer (or an anode-side gas diffusion layer and a cathode-side gas diffusion layer) in the electrolyte membrane-electrode assembly.

An example of the electrolyte membrane-electrode assembly 100 having the above-described configuration is shown in FIG. 3. FIG. 3 shows a configuration, in which the size of the anode-side catalyst layer 121a is increased more than the size of the cathode-side catalyst layer 121c, and the surface-direction end of the cathode-side catalyst layer 121c is located more inside than the surface-direction end of the anode-side catalyst layer 121a is with respect to the surface direction of the electrolyte membrane-electrode assembly 100. Note that, in the electrolyte membrane-electrode assembly 100, only the electrolyte membrane 110, the anode-side catalyst layer 121a and the cathode-side catalyst layer 121c are shown for convenience of explanation, and the description of the other layers is omitted.

In the electrolyte membrane-electrode assembly 100 having such a configuration, the spots where the surface-direction ends of the respective anode- and cathode-side catalyst layers 121a and 121c overlap with each other in the thickness direction of the electrolyte membrane-electrode assembly 100 can be completely eliminated, thus making it possible to reduce the spots to which the pressure to the electrolyte membrane 110 is locally applied.

Moreover, in the above-described configuration, the anode-side catalyst layer 121a is enlarged more than the cathode-side catalyst layer 121c, and on the peripheries of these, the adhesive layers 131a and 131c and the gasket layers 132a and 132c are arranged. In such a way, the pressure to the electrolyte membrane 110 is absorbed, and in addition, a cross leak of the oxidant gas in a region where the cathode-side catalyst layer 121c is not formed (for example, around the cathode-side catalyst layer 121c) can be prevented. Moreover, a cross leak region of oxygen ($O_2$) is reduced more than a cross leak region of hydrogen ($H_2$), thus making it possible to prevent the oxidant gas supplied to the cathode side from causing the cross leak through the electrolyte membrane 110 to the anode side. In such a way, it becomes possible to prevent the deterioration of the electrolyte membrane 110, which is caused by hydrogen peroxide generated by reaction of the hydrogen ($H_2$) and the oxygen ($O_2$) on the anode side, whereby the durability of the electrolyte membrane-electrode assembly 100 can be further enhanced.

Figure 4:
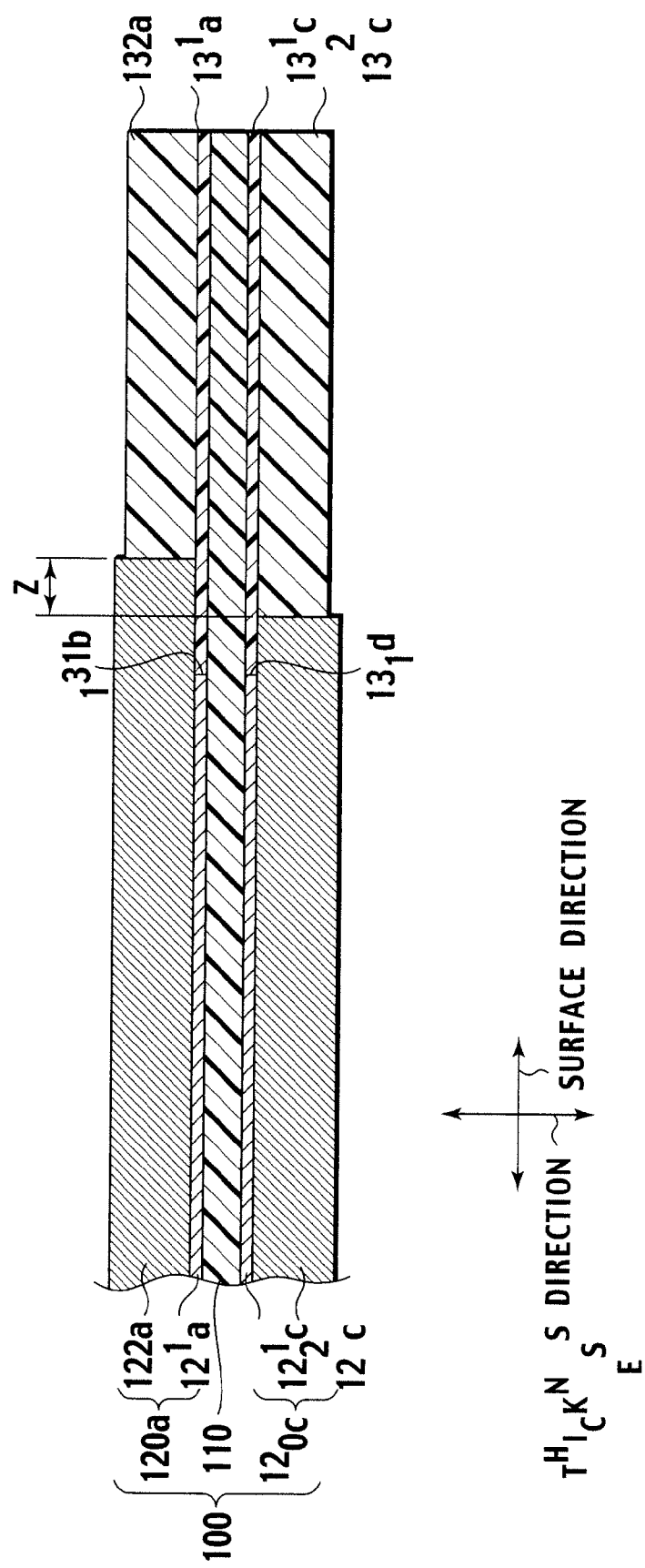
FIG. 4 is a cross-sectional view showing another example of the electrolyte membrane-electrode assembly in the present invention

In the electrolyte membrane-electrode assembly 100 of the present invention, it is preferable that the surface-direction inner end 131b of the anode-side adhesive layer 131a and the surface-direction end of the anode-side catalyst layer 121a be in intimate contact with each other. Moreover, it is preferable that the surface-direction inner end 131d of the cathode-side adhesive layer 131c and the surface-direction end of the cathode-side catalyst layer 121c be in intimate contact with each other. FIG. 4 shows an electrolyte membrane-electrode assembly 100 having such a configuration. As shown in FIG. 4, clearances between the catalyst layers 121a and 121c and the adhesive layers 131a and 131c are eliminated on the anode side and the cathode side, whereby the fuel gas or the oxidant gas can be prevented from directly contacting the electrolyte membrane 110. In such a way, it becomes possible to prevent the cross leak of the fuel gas from the anode side to the cathode side and the cross leak of the oxidant gas from the cathode side to the anode side. Therefore, a fuel consumption can be enhanced, and the deterioration of the electrolyte membrane 110, which is caused by the hydrogen peroxide generated by such cross leak gas, can be suppressed. Note that, though the intimate contact between the surface-direction ends of the catalyst layers 121a and 121c and the surface-direction inner ends 131b and 131d of the adhesive layers 131a and 131c just needs to occur on either of the anode side and the cathode side, it is particularly preferable that the intimate contact occur on both of the anode side and the cathode side.

Moreover, from a viewpoint of surely preventing the fuel gas or the oxidant gas from directly contacting the electrolyte membrane 110, it is preferable that the surface-direction ends of the catalyst layers 121a and 121c and the surface-direction inner ends 131b and 131d of the adhesive layers 131a and 131c overlap with each other. Specifically, it is preferable that the surface-direction inner end 131b of the anode-side adhesive layer 131a and the surface-direction end of the anode-side catalyst layer 121a overlap with each other with respect to the thickness direction of the electrolyte membrane-electrode assembly 100. Moreover, it is preferable that the surface-direction inner end 131d of the cathode-side adhesive layer 131c and the surface-direction end of the cathode-side catalyst layer 121c overlap with each other with respect to the thickness direction of the electrolyte membrane-electrode assembly 100.

At this time, the surface-direction ends of the catalyst layers 121a and 121c may cover the surface-direction inner ends 131b and 131d of the adhesive layers 131a and 131c, or alternatively, the surface-direction inner ends 131b and 131d of the adhesive layers 131a and 131c may cover the surface-direction ends of the catalyst layers 121a and 121c. Most preferably, a configuration is mentioned, in which a material such as an adhesive constituting the surface-direction inner ends 131b and 131d of the adhesive layers 131a and 131c is impregnated into pores of the surface-direction ends of the catalyst layers 121a and 121c. With this configuration, the stress concentration to the electrolyte membrane 110 can be absorbed. The overlap between the surface-direction ends of the catalyst layers 121a and 121c and the surface-direction inner ends 131b and 131d of the adhesive layers 131a and 131c may occur on either one of the anode side and the cathode side; however, it is particularly preferable that the overlap occur on both of the anode side and the cathode side.

In the electrolyte membrane-electrode assembly 100 of the present invention, from a viewpoint of reducing the spots where the surface-direction ends of the respective layers are adjacent to one another and absorbing the pressure to the electrolyte membrane 110, it is preferable that the size of either one of the anode-side gas diffusion layer 122a and the cathode-side gas diffusion layer 122c be increased more than the size of the other of the anode-side gas diffusion layer 122a and the cathode-side gas diffusion layer 122c. Moreover, it is preferable that the surface-direction end of the anode-side gas diffusion layer 122a or the cathode-side gas diffusion layer 122c, of which size is smaller, be located more inside than the surface-direction end of the other of the anode-side gas diffusion layer 122a and the cathode-side gas diffusion layer 122c is with respect to the surface direction of the electrolyte membrane-electrode assembly 100.

An example of the electrolyte membrane-electrode assembly 100 having the above-described configuration has a configuration similar to that in FIG. 3 described above. Specifically, FIG. 3 also shows a configuration, in which the size of the anode-gas diffusion layer 122a is enlarged more than the size of the cathode-side gas diffusion layer 122c, and the surface-direction end of the cathode-side gas diffusion layer 122c is located more inside than the surface-direction end of the anode-side gas diffusion layer 122a is with respect to the surface direction of the electrolyte membrane-electrode assembly 100. Note that, in the electrolyte membrane-electrode assembly 100, only the electrolyte membrane 110, the anode-side gas diffusion layer 122a and the cathode-side gas diffusion layer 122c are shown for convenience of explanation, and the description of the other layers is omitted.

Moreover, FIG. 4 shows a configuration, in which the size of the anode-gas diffusion layer 122a is increased more than the size of the cathode-gas diffusion layer 122c, and the surface-direction end of the cathode-side gas diffusion layer 122c is located more inside than the surface-direction end of the anode-side gas diffusion layer 122a is with respect to the surface direction.

A gap between the surface-direction end of one of the cathode-side gas diffusion layer 122c and the anode-side gas diffusion layer 122a and the surface-direction end of the other of the cathode-side gas diffusion layer 122c and the anode-side gas diffusion layer 122a is recommended to be set at preferably about 0.1 to 10 mm, more preferably, about 0.5 to 3 mm. Specifically, it is preferable that a width shown by arrows Z in FIG. 4 be set within the above-described range. In such a way, the pressure to the electrolyte membrane 110 can be absorbed.

As described above, either of the anode-side gas diffusion layer 122a and the cathode-side gas diffusion layer 122c may be increased in size. However, pursuant to the fact that the anode-side catalyst layer 121a is enlarged more than the cathode-side catalyst layer 121c from a viewpoint of the cross leak and the deterioration of the electrolyte membrane 110 owing to the hydrogen peroxide, which are mentioned above, it is preferable to enlarge the anode-side gas diffusion layer 122a.

Moreover, in the electrolyte membrane-electrode assembly 100 of the present invention, it is preferable that a thickness of the anode-side catalyst layer 121a and a thickness of the anode-side adhesive layer 131a become substantially equal to each other, and that a thickness of the cathode-side catalyst layer 121c and a thickness of the cathode-side adhesive layer 131c become substantially equal to each other. In such a way, the pressure applied to the inside of the surface of the electrolyte membrane 110 can be made constant, and the damage on the electrolyte membrane 110, which is caused by the fact that the pressure is locally applied thereto, can be prevented.

It is preferable that the thickness of the catalyst layers 121a and 121c and the thickness of the adhesive layers 131a and 131c be made substantially equal to each other. Specifically, it is preferable to set a difference between the thickness of the catalyst layers 121a and 121c and the thickness of the adhesive layers 131a and 131c at 10 μm or less. Moreover, though the thickness of the catalyst layers 121a and 121c and the thickness of the adhesive layers 131a and 131c may be made substantially equal to each other on either the anode side or the cathode side, it is more preferable that these thicknesses may be made substantially equal to each other on both of the anode and the cathode side.

Figure 5:
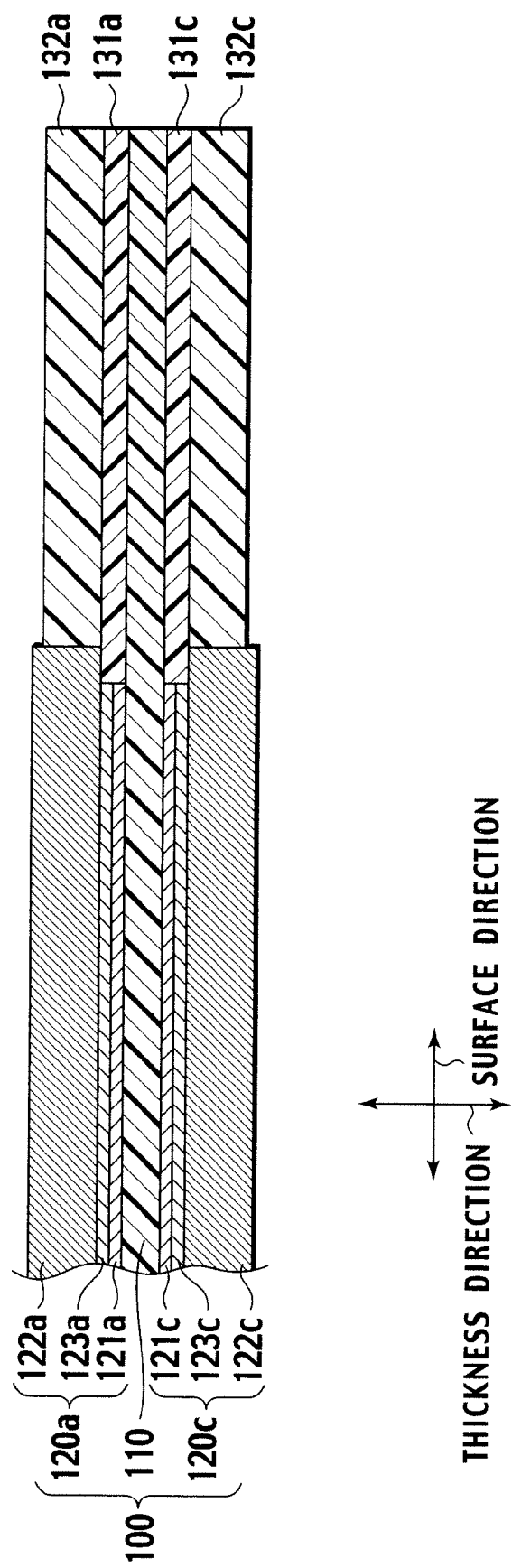
FIG. 5 is a cross-sectional view showing an electrolyte membrane-electrode assembly in the present invention, on which second gas diffusion layers is further formed.

In general, the gas diffusion layers 122a and 122c are made of only a base material such as carbon paper. In order to further enhance gas diffusibility in the electrodes, it is preferable to arrange second gas diffusion layers 123a and 123c smaller in average pore diameter than the gas diffusion layers 122a and 122c. As shown in FIG. 5, the second gas diffusion layers 123a and 123c, which are arranged on the anode side and the cathode side, respectively, are arranged on the surfaces of the gas diffusion layers 122a and 122c on the catalyst layers 121a and 121c sides.

In the electrolyte membrane-electrode assembly 100 including the second gas diffusion layers 123a and 123c, it is preferable to set a size of the second gas diffusion layers 123a and 123c at substantially the same size as that of the catalyst layers 121a and 121c from a viewpoint of making the pressure constant, which is applied to the inside of the surface of the electrolyte membrane 110. Moreover, it is preferable to substantially equalize a total thickness of each of pairs of the second gas diffusion layers 123a and 123c and the catalyst layers 121a and 121c to a thickness of the corresponding adhesive layers 131a or 131c.

Specifically, as a preferable mode of the electrolyte membrane-electrode assembly 100 of the present invention, the following one is mentioned. Specifically, the anode-side second gas diffusion layer 123a smaller in average pore diameter than the anode-side gas diffusion layer 122a is disposed between the anode-side gas diffusion layer 122a and the anode-side catalyst layer 121a. And, the total thickness of the anode-side catalyst layer 121a and the anode-side second gas diffusion layer 123a and the thickness of the anode-side adhesive layer 131a are substantially equal to each other. Moreover, the cathode-side second gas diffusion layer 123c smaller in average pore diameter than the cathode-side gas diffusion layer 122c is disposed between the cathode-side gas diffusion layer 122c and the cathode-side catalyst layer 121c. And, the total thickness of the cathode-side catalyst layer 121c and the cathode-side second gas diffusion layer 123c and the thickness of the cathode-side adhesive layer 131c are substantially equal to each other.

In the electrolyte membrane-electrode assembly 100 of the present invention, a sealing protrusion may be further formed on at least one of the anode-side gasket layer 132a and the cathode-side gasket layer 132c in order to further enhance gas sealing property. The sealing protrusion is one for filling a clearance and the like between the electrolyte membrane-electrode assembly 100 and the separator. As shown in FIG. 6, it is recommended that sealing protrusions 140a and 140c be formed at least partially adjacent to the gasket layers 132a and 132c. In accordance with the sealing protrusions, it becomes possible to enhance the gas sealing property in the case of assembling the fuel cell.

A shape of the sealing protrusions may be any as long as it is possible to enhance sealing property of the electrolyte membrane-electrode assembly 100, and as a cross-sectional shape thereof, there are mentioned a triangle, a quadrangle, a semicircle, a dogleg shape, a U-shape, an H-shape (corners may be chamfered), and the like.

Moreover, spots where the sealing protrusions are formed may be any as long as it is possible to enhance the sealing property of the electrolyte membrane-electrode assembly 100, and the sealing protrusions just need to be formed while at least partially contacting the gasket layers 132a and 132c. Moreover, the sealing protrusions may be sprinkled so as to fill recesses of the separators, which are formed by flow passages and the like for the gas, a cooling medium and the like. The sealing protrusions may be formed in a frame shape so as to surround the peripheries of the electrodes on the electrolyte membrane 110.

Next, a description will be made of components contained in the respective layers of the electrolyte membrane-electrode assembly 100 of the present invention.

(Electrolyte Membrane)

No particular limitations are imposed on the electrolyte membrane for use in the electrolyte membrane-electrode assembly of the present invention, and as the electrolyte membrane, a membrane made of an electrolyte having proton conductivity is mentioned. For example, there can be used: a fluorine-based polymer electrolyte membrane such as a perfluorosulfonic acid membrane represented by a variety of Nafions made by DuPont Corporation and represented by Flemion, ion exchange resin made by The Dow Chemical Company, an ethylene-tetrafluoroethylene copolymer resin membrane, and a resin membrane containing trifluorostyrene as a base polymer; and a hydrocarbon-based electrolyte membrane containing a sulfonic acid group. Moreover, there can also be used: a membrane in which a liquid electrolyte such as phosphoric acid and ionic liquid is impregnated into a polymer microporous membrane formed of polytetrafluoroethylene (PTFE), polyvinylidene fluoride (PVDF) or the like; and a membrane in which a polymer electrolyte is filled into a porous body. Note that the electrolyte for use in the electrolyte membrane and the electrolyte for use in the respective catalyst layers may be the same or different.

The thickness of the electrolyte membrane just needs to be decided as appropriate in consideration for characteristics of the obtained electrolyte membrane-electrode assembly. Preferably, the thickness is 5 to 300 µm, more preferably, 10 to 200 µm, and particularly preferably, 15 to 100 µm. From a viewpoint of strength at the time of forming the membrane and the durability at the time of the operation, the thickness is preferably 5 µm or more, and from a viewpoint of output characteristics at the time of the operation, the thickness is preferably 300 µm or less.

(Catalyst Layer)

First, each of the catalyst layers individually used for the anode and the cathode contains an electrode catalyst formed by supporting a catalyst component on a conductive support, and a polymer electrolyte.

The catalyst component for use in the cathode-side catalyst layer is not particularly limited as long as it has a catalytic function for a reduction reaction of oxygen. Meanwhile, the catalyst component for use in the anode-side catalyst layer is not particularly limited, either, as long as it has a catalytic function for an oxidation reaction of hydrogen. Specifically, the catalyst components are selected from metal such as platinum, ruthenium, iridium, rhodium, palladium, osmium, tungsten, lead, iron, chromium, cobalt, nickel, manganese, vanadium, molybdenum, gallium and aluminum, alloys thereof, and the like. Among them, one at least containing platinum is preferably used in order to enhance catalyst activity, poisoning resistance to carbon monoxide and the like, heat resistance, and the like. It is recommended that a composition of such an alloy as described above be set at 30 to 90 atom % for the platinum and 10 to 70 atom % for a metal alloyed therewith though depending on a type of the alloyed metal. A composition of an alloy in the case of using the alloy as the cathode catalyst differs depending on the type of the metal alloyed therewith, and can be selected appropriately by those skilled in the art; however, preferably, is set at 30 to 90 atom % for the platinum, and 10 to 70 atom % for the other metal alloyed therewith.

Note that, in general, the alloy is one in which one or more types of metal elements or nonmetal elements are added to a metal element, and is a generic name for those having metallic property. In terms of an organization of the alloy, there are: an eutectic alloy as a so-called mixture containing the component elements which become separate crystals; one in which the component elements are completely solved together to turn to a solid solution; one in which the component elements form an intermetallic compound or a compound of metal and nonmetal; and the like. In this application, the alloy may be any of the above.

The catalyst component for use in the cathode-side catalyst layer and the catalyst component for use in the anode-side catalyst layer can be appropriately selected from the above-described ones. In the following description, unless otherwise specified, the description of the catalyst components for the catalyst layers for use in the cathode and the anode makes similar definitions for both thereof, and the catalyst components are comprehensively referred to as "a catalyst component". However, it is not necessary that the catalyst components for the respective catalyst layers for use in the cathode and the anode be the same, and the catalyst components are appropriately selected so as to exert the desired functions as described above.

Shape and size of the catalyst component is not particularly limited; however, it is preferable that the catalyst component be particulate. In this case, as an average particle diameter of catalyst particles for use in the catalyst layers is being smaller, an effective electrode area where an electrochemical reaction advances is increased, and accordingly, this is preferable since oxygen reduction activity is also increased. However, in actual, when the average particle diameter is too small, a phenomenon is observed that the oxygen reduction activity is decreased on the contrary. Hence, the average particle diameter of the catalyst particles contained in the catalyst layers is preferably 1 to 30 nm, more preferably, 1.5 to 20 nm, still more preferably, 2 to 10 nm, and particularly preferably, 2 to 5 nm. From a viewpoint of easiness of supporting the particles, the particle diameter is preferably 1 nm or more, and from a viewpoint of a utilization ratio of the catalyst, the average particle diameter is preferably 30 nm or less. Note that "the average particle diameter of the catalyst particles" can be measured by a crystallite diameter obtained from a half width of a diffraction peak of the catalyst component in X-ray diffraction or by an average value of the particle diameters of the catalyst component, which are investigated by a transmission electron microscope.

The conductive support in the electrode catalyst just needs to be one having a specific surface area for supporting the catalyst component in a desired dispersed state, and having sufficient electron conductivity as a current collector, and one containing carbon as a main component is preferable. Specifically, there are mentioned carbon particles made of carbon black, activated carbon, coke, natural graphite, artificial graphite, and the like. Note that, in the present invention, "containing carbon as a main component" refers to that carbon atoms are contained as a main component, and is a concept including both of that the conductive support is made only of the carbon atoms, and that the conductive support is substantially made of the carbon atoms. Depending on the case, elements other than the carbon atoms may be contained in order to enhance the characteristics of the fuel cell. Note that the matter that the conductive support is substantially made of the carbon atoms stands for that mixing of impurities of approximately 2 to 3 mass % or less is permitted.

A BET specific surface of the conductive support just needs to be a specific surface area sufficient for supporting the catalyst component in a highly dispersive manner; however, is recommended to be set at preferably 20 to 1600 $m^2/g$, and more preferably, 80 to 1200 $m^2/g$. When the specific surface area is 20 $m^2/g$ or more, dispersibility of the catalyst component in the conductive support and of the polymer electrolyte to be described layer is not decreased, and sufficient power generation performance can be obtained. When the specific surface area is 1600 $m^2/g$ or less, effective utilization ratios of the catalyst component and the polymer electrolyte are avoided being decreased on the contrary.

Moreover, a size of the conductive support is not particularly limited; however, from a viewpoint of controlling the easiness of supporting the particles, the catalyst utilization ratio and the thickness of the catalyst layer within appropriate ranges, it is recommended that the average particle diameter be set at approximately 5 to 200 nm, and preferably, at approximately 10 to 100 nm.

In the electrode catalyst in which the catalyst component is supported on the conductive support, it is recommended that a supported amount of the catalyst component with respect to a total amount of the electrode catalyst be set at preferably 10 to 80 mass %, and more preferably, 30 to 70 mass %. When the supported amount is 80 mass % or less, the dispersibility of the catalyst component on the conductive support is not decreased, the power generation performance is enhanced more following the increase of the supported amount, and an economical advantage is not decreased. Meanwhile, when the supported amount is 10 mass % or more, the catalyst activity per unit weight is not decreased, and there does not arise a necessity for a large amount of the electrode catalyst for the purpose of obtaining the desired power generation performance. Note that the supported amount of the catalyst component can be investigated by the inductively coupled plasma-optical emission spectroscopy (ICP).

As the polymer electrolyte of the present invention, which is for use in the respective catalyst layers used for the cathode and the anode, publicly known one can be used without being particularly limited, and the polymer electrolyte just needs to be a member at least having high proton conductivity. The polymer electrolyte membrane usable in this case is broadly divided into a fluorine-based electrolyte containing fluorine atoms in the entire or a part of polymer skeletons, and into a hydrocarbon-based electrolyte that does not contain the fluorine atoms in the polymer skeletons.

As suitable examples of the fluorine-based electrolyte, specifically, there are mentioned perfluorocarbon sulfonic acid-based polymer, polytrifluorostyrene sulfonic acid-based polymer, perfluorocarbon phosphonic acid-based polymer, trifluorostyrene sulfonic acid-based polymer, ethylenetetrafluoroethylene-g-styrenesulfonic acid polymer, ethylene-tetrafluoroethylene copolymer, polyvinylidene fluoride-perfluorocarbon sulfonic acid-based polymer, and the like, which include Nafion (made by DuPont Corporation), Aciplex (made by Asahi Kasei Corporation), Flemion (made by Asahi Glass Co., Ltd.), and the like.

As suitable examples of the hydrocarbon-based electrolyte, specifically, there are mentioned polysulfone sulfonic acid, polyaryletherketone sulfonic acid, polybenzimidazole alkylsulfonic acid, polybenzimidazole alkylphosphonic acid, polystyrene sulfonic acid polyetheretherketone sulfonic acid, polyphenyl sulfonic acid, and the like.

It is preferable that the polymer electrolyte contain the fluorine atoms since the fluorine atoms are excellent in heat resistance and chemical stability. As the polymer electrolyte, fluorine-based electrolytes such as Nafion, Aciplex and Flemion are preferably mentioned.

Moreover, for supporting the catalyst component on the conductive support, there can be used methods such as an impregnation method, a liquid-phase reduction/support method, an evaporation-to-dryness method, a colloid adsorption method, a spray thermal decomposition method, and reversed micelle (microemulsion method). Moreover, a commercially available one may be used as the electrode catalyst.

It is recommended that the thickness of the catalyst layers for use in the anode and the cathode be set at preferably 1 to 30 μm, and more preferably, 1 to 20 μm in consideration for the diffusibility of the gas supplied from the outside and the power generation performance of the electrolyte membrane-electrode assembly.

(Gas Diffusion Layer)

As the gas diffusion layer, one using, as a base material, a sheet-like material having conductivity and porosity, such as fabric, an article made into a paper form, felt, and nonwoven fabric, which are made of carbon, can be used.

In the gas diffusion layer, it is preferable that the base material be allowed to contain a water repellent for the purpose of preventing a flooding phenomenon and the like by enhancing water repellency more. As the water repellent, there are mentioned: fluorine-based polymer materials such as polytetrafluoroethylene (PTFE), polyvinylidene fluoride (PVDF), polyhexafluoropropylene, and tetrafluoroethylene-hexafluoropropylene copolymer (FEP); polypropylene; polyethylene; and the like.

The thickness of the gas diffusion layer just needs to be appropriately decided in consideration for the characteristics of the obtained gas diffusion layer; however, just needs to be set at approximately 30 to 500 μm. In general, when the thickness of the gas diffusion layer is too thin, there is an apprehension that sufficient mechanical strength cannot be obtained, and when the thickness is too thick, a distance by which the gas, water, and the like transmit becomes long, and this is not preferable.

It is recommended that the average pore diameter of the gas diffusion layer be set at preferably 0.1 to 50 μm, and more preferably, at 1 to 30 μm.

(Second Gas Diffusion Layer)

Moreover, in order to enhance the water repellency more, the second gas diffusion layer having a smaller average pore diameter than the gas diffusion layer may be disposed between the catalyst layer and the gas diffusion layer.

The second gas diffusion layer just needs to be the one having the average pore diameter smaller than the gas diffusion layer, and for example, one is mentioned, which is formed of aggregates of carbon particles containing a water repellent.

As the carbon particles, there can be used carbon black, graphite, expanded graphite, and the like. Among them, the carbon black such as oil furnace black, channel black, lump black, thermal black, and acetylene black is preferably mentioned since the carbon black is excellent in electron conductivity and has a large specific surface area. It is recommended that a particle diameter of the carbon particles be set at approximately 10 to 100 nm. In such a way, high water repellency by capillary force can be obtained, and it also becomes possible to enhance contact property of the carbon black with the catalyst layer.

As the water repellent for use in the second gas diffusion layer, a similar one to the above-mentioned water repellent for use in the gas diffusion layer is mentioned. As the water repellent, a fluorine-based polymer material is preferably used since the polymer material is excellent in water repellency, corrosion resistance at the time of the electrode reaction, and the like.

With regard to a mixing ratio of the carbon particles and the water repellent, there is an apprehension that the water repellency cannot be obtained as expected when the carbon particles are too much, and there is an apprehension that sufficient electron conductivity cannot be obtained when the water repellent is too much. In consideration for these, it is recommended that the mixing ratio of the carbon particles and the water repellent in the carbon particle layer be set at approximately 90:10 to 40:60 in a mass ratio.

The thickness of the second gas diffusion layer just needs to be appropriately decided in consideration for the water repellency of the obtained gas diffusion layer; however, is recommended to be set at preferably 1 to 100 μm, and more preferably, at 10 to 50 μm.

Moreover, it is recommended that the average pore diameter of the second gas diffusion layer be set at preferably 0.01 to 10 μm, and more preferably, at 0.1 to 5 μm. Note that the average pore diameters in the gas diffusion layer and the second gas diffusion layer can be measured by using a method such as a mercury porosimetry method, a BET method, and a DSC method.

(Adhesive Layer)

The adhesive layer is disposed on the electrolyte membrane from the surface-direction end of the electrode toward the outside. The adhesive layer just needs to be formed on at least a part on the peripheral edge portion of the electrolyte membrane. However, in consideration for ensuring the adhesion property of the adhesive layer onto the gasket layer and the gas diffusion layer, it is preferable that the adhesive layer be formed into a frame shape on the entire peripheral edge portion of the electrolyte membrane so as to surround the electrode.

A material usable as the adhesive layer just needs to be one capable of intimately adhering the electrolyte membrane and the anode-/cathode-side catalyst layers onto the gasket layers. There can be used: a hot melt adhesive such as polyolefin, polypropylene and thermoplastic elastomer; an acrylic adhesive; polyester; an olefin adhesive such as polyolefin; and the like. The thickness of the adhesive layer is decided mainly by the thicknesses and elastic moduli of the catalyst layer, the gas diffusion layer, the second gas diffusion layer, and the like, and is preferably 20 to 400 μm, and more preferably, 10 to 25 μm.

(Gasket Layer)

The gasket layer is disposed in contact with the adhesive layer from the surface-direction end of the electrode toward the outside.

The gasket layer just needs to be disposed in contact with at least a part of the adhesive layer. However, in consideration for the gas sealing property of the electrolyte membrane-electrode assembly, it is preferable that the gasket layer be formed in a frame shape on the entire peripheral edge portion of the electrolyte membrane so as to surround the electrode.

The gasket layer just needs not to allow gas, and particularly, the fuel gas and the oxidant gas to permeate therethrough. In general, the gasket layer is made of a gas-impermeable material. Such a material constituting the gasket layer just needs to be one that exhibits impermeability to the fuel gas and the oxidant gas in the case of assembling the electrolyte membrane-electrode assembly. Specifically, there are mentioned polyethylene naphthalate (PEN), polyethylene terephthalate (PET), polytetrafluoroethylene (PTFE), polyvinylidene fluoride (PVDF), and the like. The thickness of the gasket layer is preferably 15 to 40 μm.

(Sealing Protrusion)

The sealing protrusion just needs to be made of a material capable of ensuring the sealing property between the separator and the electrolyte membrane-electrode assembly. There are preferably mentioned: rubber materials such as fluorine rubber, silicon rubber, ethylene propylene rubber (EPDM), and polyisobutylene rubber; fluorine-based polymer materials such as polytetrafluoroethylene (PTFE), polyvinylidene fluoride (PVDF); polyhexafluoropropylene, and tetrafluoroethylene-hexafluoropropylene copolymer (FEP); thermoplastic resins such as polyolefin and polyester; and the like. If these materials are used, then the electrolyte membrane-electrode assembly and the separator can be brought into intimate contact with each other, and the gas sealing property is enhanced.

As described above, the electrolyte membrane-electrode assembly of the present invention can prevent the deterioration of the electrolyte membrane, which is caused by the pressure at the time of the hot press, the fastening, and so on, and is excellent in durability. Moreover, the electrolyte membrane-electrode assembly can integrate the gasket layers with the electrolyte membrane-electrode assembly itself, and is excellent also in handling easiness and assembling easiness. Hence, if the above-described electrolyte membrane-electrode assembly is used, then it becomes possible to provide a fuel cell excellent in durability, reliability and the like.

The type of the fuel cell is not particularly limited, and the above description has been made by taking the polymer electrolyte fuel cell as an example. However, besides this, there are mentioned: an alkaline fuel cell; a fuel cell of an acidic electrolyte, which is represented by a phosphoric acid fuel cell; a direct methanol fuel cell; a micro fuel cell; and the like. Among them, a polymer electrolyte fuel cell that is compact and capable of high densification/high output is preferably mentioned.

The polymer electrolyte fuel cell is useful as a stationary power supply, a power supply for a consumer mobile device such as a cellular phone, an emergency power supply, an outdoor power supply such as a power supply for leisure, construction or the like, a power supply for a mobile body such as an automobile in which a mounting space of the power supply is limited, and the like. Among them, it is particularly preferable that the polymer electrolyte fuel cell be used as the power supply for the mobile body such as the automobile, in which the carbon support is prone to be corroded by the fact that a high output voltage is required after a relatively long-time stop of an operation, and the polymer electrolyte is prone to be deteriorated by the fact that a high output voltage is taken out at the time of the operation.

As the configuration of the fuel cell, in usual, a configuration in which the MEA is sandwiched by the separators is provided. As the separators, there can be used: ones made of carbon such as dense graphite and carbon plates; ones made of metal such as stainless steel; and the like. The separators are ones having a function to separate the air and the fuel gas from each other, and flow passage grooves for ensuring flow passages thereof may be formed thereon. Thickness and size of the separators, a shape of the flow passage grooves, and the like just need to be appropriately decided in consideration for the output characteristics of the obtained fuel cell.

Moreover, in order that the fuel cell can obtain a desired voltage and the like, a stack may be formed, in which a plurality of the MEAs are stacked on one another while interposing the separators thereamong, and are connected in series. A shape of the fuel cell just needs to be appropriately decided so that desired cell characteristics such as a voltage can be obtained.

Next, a description will be made of the production method of the electrolyte membrane-electrode assembly of the present invention. The production method of the electrolyte membrane-electrode assembly of the present invention includes the steps of: (A) forming an anode-side catalyst layer on one side of an electrolyte membrane and a cathode-side catalyst layer on the other side; (B) forming an anode-side adhesive layer and an anode-side gasket layer on at least a part of a periphery of the anode-side catalyst layer on the electrolyte membrane, and a cathode-side adhesive layer and a cathode-side gasket layer on a periphery of the cathode-side catalyst layer on the electrolyte membrane; and (C) forming an anode-side gas diffusion layer on the anode-side catalyst layer, and a cathode-side gas diffusion layer on the cathode-side catalyst layer. Moreover, a surface-direction inner end of the anode-side adhesive layer is formed so as to be located inside beyond a surface-direction inner end of the anode-side gasket layer, a part of the anode-side adhesive layer is formed so as to overlap with a part of the anode-side gas diffusion layer, a surface-direction inner end of the cathode-side adhesive layer is formed so as to be located inside beyond a surface-direction inner end of the cathode-side gasket layer, and a part of the cathode-side adhesive layer is formed so as to overlap with a part of the cathode-side gas diffusion layer.

First, in the step (A), the anode-side catalyst layer and the cathode-side catalyst layer are individually fabricated on both sides of the electrolyte membrane. For this, a method is used, which is for forming catalyst layers by applying, on the surfaces of the electrolyte membrane, catalyst ink, the catalyst ink containing materials, such as an electrode catalyst and an electrolyte, constituting the catalyst layers, and containing a solvent.

As the solvent, there can be used: water; and lower alcohol such as cyclohexanol, ethanol, and 2-propanol. Moreover, with regard to a usage amount of the solvent, it is preferable that the electrode catalyst be present as a content in the catalyst ink by an amount in a range of 5 to 30 mass %, and more preferably, 9 to 20 mass %.

The catalyst ink of the present invention may contain a thickener. Use of the thickener is effective in such a case where the catalyst ink cannot be applied well. As the thickener usable in this case, there are mentioned glycerin, ethylene glycol (EG), polyvinyl alcohol (PVA), propylene glycol (PG), and the like. An addition amount of the thickener in the case of using the thickener just needs to be an amount to an extent of not inhibiting the above-described effect of the present invention; however, is preferably 5 to 20 mass % with respect to a total amount of the catalyst ink.

A preparation method of the catalyst ink of the present invention is not particularly limited as long as the catalyst ink is one in which the electrode catalyst, the electrolyte and the solvent, and the thickener according to needs, are mixed as appropriate. For example, the electrolyte is added to the solvent, a mixed solution thus obtained is heated/stirred, and the electrolyte is dissolved into the solvent, and thereafter, the electrode catalyst is added to a resultant, whereby the catalyst ink can be prepared. Alternatively, the electrolyte is dispersed/suspended once into the solvent, and thereafter, such a dispersed/suspended solution is mixed with the electrode catalyst, whereby the catalyst ink may be prepared. Moreover, a commercially available electrolyte solution (for example, Nafion solution made by DuPont Corporation: one in which Nafion with a concentration of 5 wt % is dispersed/suspended into 1-propanol), in which the electrolyte is prepared into the above-described solvent in advance, may be used as it is for the above-described method.

The catalyst ink is applied on the electrolyte membrane, whereby the respective catalyst layers are formed. In this case, as forming conditions of the anode-/cathode-side catalyst layers on the electrolyte membrane, the catalyst ink is applied on the electrolyte membrane so that a thickness thereof after the ink is dried can be 5 to 20 μm, and then the catalyst ink is dried in a vacuum dryer or under a reduced pressure at 25 to 150° C., and more preferably, 60 to 120° C. for 5 to 30 minutes, and more preferably, 10 to 20 minutes.

As an applying method of the catalyst ink, a die coater method, a screen printing method, a doctor blade method, a spray method, and the like can be used. Moreover, when the thickness of the catalyst layers is not sufficient, the above-described applying/drying steps may be repeated until the thickness reaches the desired thickness.

Note that, the above description has been made of the method for directly forming the anode-/cathode-side catalyst layers on the electrolyte membrane by directly applying the materials of these thereon. However, the electrolyte membrane-electrode assembly of the present invention can be produced by other methods such as a transfer method.

First, such catalyst ink as prepared in the above is applied/dried on mounts for the transfer, and thereby the catalyst layers are formed. In this case, as the mounts for the transfer, polyester sheets such as PTFE (polytetrafluoroethylene) sheets and PET (polyethylene terephthalate) sheets, and the like can be used. Next, the electrolyte membrane is sandwiched by the catalyst layers thus prepared, the hot press is performed for an obtained stacked body, and thereafter, the mounts for the transfer are peeled off, whereby the electrolyte membrane in which the anode-side catalyst layer and the cathode-side catalyst layer are arranged on both surfaces can be obtained.

In the method of the present invention, next, the step (B) of forming the adhesive layers and the gasket layers on the peripheries of the catalyst layers on the electrolyte membrane is performed. In the step (B), in order to form the adhesive layers and the gasket layers, first, the above-described adhesive is applied on the electrolyte membrane, or on the electrolyte membrane while coating the surface-direction ends of the catalyst layers, and thereafter, the gas-impermeable material is applied thereon, and the material is cured by heating at 25 to 150° C. for 10 seconds to 10 minutes. Alternatively, the following method may be adopted. The gas-impermeable material is molded into a sheet shape in advance to form the gasket layers, and then the adhesive is applied on the gasket layers to form the adhesive layers, and thereafter, the adhesive layers are pasted onto the electrolyte membrane, or on the electrolyte membrane while partially coating the catalyst layers.

Note that, in the case of forming the adhesive layers and the gasket layers in the step (B), it is preferable to make adjustment as shown in FIG. 1 so that the surface-direction inner ends of the adhesive layers can protrude toward the inside of the electrolyte membrane-electrode assembly without being coated by the gasket layers.

Specifically, it is preferable that, with respect to the surface direction of the electrolyte membrane-electrode assembly, the surface-direction inner end of the anode-side adhesive layer be formed so as to be located inside beyond the surface-direction inner end of the anode-side gasket layer, and a part of the anode-side adhesive layer overlap with a part of the anode-side gas diffusion layer. Furthermore, it is preferable that, with respect to the surface direction of the electrolyte membrane-electrode assembly, the surface-direction inner end of the cathode-side adhesive layer be formed so as to be located inside beyond the surface-direction inner end of the cathode-side gasket layer, and a part of the cathode-side adhesive layer overlap with a part of the cathode-side gas diffusion layer.

Next, in the method of the present invention, the step (C) of arranging the gas diffusion layers on the respective catalyst layers of the anode and the cathode, which are fabricated in the manner as described above, is performed. At this time, for the gas diffusion layers, ones larger than the catalyst layers are used, and the gas diffusion layers are arranged on the catalyst layers so as to go beyond the surface-direction ends of the catalyst layers.

In the case of allowing the gas diffusion layers to contain the water repellent, a method can be used, which is for immersing the base material for use in the gas diffusion layers into a dispersion of the water repellent, followed by heating and drying by an oven or the like.

Moreover, the step (C) may be a step (C') of arranging the second gas diffusion layers and the gas diffusion layers on the respective catalyst layers of the anode and the cathode.

In the case of arranging the second gas diffusion layers between the gas diffusion layers and the catalyst layers, such arrangement just needs to be performed by using a method for arranging the second gas diffusion layers on the catalyst layers after arranging the second gas diffusion layers on the gas diffusion layers in advance, or using a method for sequentially arranging the second gas diffusion layers and the gas diffusion layers on the catalyst layers, and the like.

As a method for forming the second gas diffusion layers, a method can be used, which is for dispersing the carbon particles, the water repellent and the like into a solvent such as water, perfluorobenzene, dichloropentafluoropropane, and an alcohol-based solvent such as methanol and ethanol, thereby preparing slurry, and applying the slurry on the gas diffusion layers or the catalyst layers, followed by drying. Moreover, a method can be used, which is for drying and milling the slurry once into powder, and applying the powder on the gas diffusion layers or the catalyst layers. It is preferable that, thereafter, the slurry be subjected to heat treatment at approximately 250 to 400° C. by using a muffle furnace or a baking furnace.

In the method of the present invention, an order of performing the step (A), the step (B) and the step (C) is not particularly limited, and these steps just need to be appropriately combined so that the electrolyte membrane-electrode assembly of the present invention can be obtained.

Moreover, in the method of the present invention, for at least one of stacked bodies obtained in the step (A), the step (B) and/or the step (C), the hot press may be performed. In such a way, the bonding characteristics among the respective layers can be enhanced. Specifically, the hot press may be performed for a stacked body (A) composed of the anode-side catalyst layer, the electrolyte membrane and the cathode-side catalyst layer, which is obtained in the step (A). Moreover, the hot press may be performed for a stacked body (B) obtained in the step (B), the stacked body (B) being one in which the adhesive layers and the gasket layers are arranged individually on the anode side and the cathode side. Furthermore, the hot press may be performed for a stacked body (C) obtained in the step (C), the stacked body (C) being one in which the gas diffusion layers are arranged on the anode side and the cathode side of the stacked body (B).

The hot press may be performed for any or all of the stacked body (A), the stacked body (B) and the stacked body (C). Moreover, in the case of performing the hot press for all of the above, the respective stacked body (A), stacked body (B) and stacked body (C) may be prepared in advance, and the hot press may be implemented therefor simultaneously. Moreover, the formation and hot press of the respective stacked bodies (A), (B) and (C) may be implemented individually continuously.

Conditions of the hot press just need to be conditions where the respective layers can be bonded to one another sufficiently intimately. However, it is preferable to perform the hot press at 60 to 200° C., and more preferably, 110 to 170° C. with a press pressure of 0.3 to 5 MPa to the electrode surfaces and the gasket surfaces.

The method of the present invention may further include the step of: (D) providing the sealing protrusion on at least one of the anode-side gasket layer and the cathode-side gasket layer.

As a forming method of the sealing protrusion, a cutting process, an injection molding method and the like are used. For example, there are used: a method of disposing/adhering one, which is processed in advance into predetermined shape such as a sheet shape and an O-ring shape and so as to have a predetermined thickness, on the gasket layer by using a metal mold; a method of applying, on the gasket layer, a gasket layer-forming material having fluidity into a predetermined shape and so as to have a predetermined thickness, followed by curing; and the like.

The entire contents of Japanese Patent Application No. 2005-252660 (filed on Aug. 31, 2005) are incorporated herein by reference.

The description has been made above of the contents of the present invention along the embodiments and the examples; however, it is self-obvious for those skilled in the art that the present invention is not limited to the description of these, and various modifications and improvements are possible.

INDUSTRIAL APPLICABILITY

In accordance with the present invention, it becomes possible to provide the electrolyte membrane-electrode assembly in which the durability is enhanced by preventing the deterioration of the electrolyte membrane, which is caused by the pressure at the time of the hot press, the fastening, and so on.

The invention claimed is:

1. An electrolyte membrane-electrode assembly, comprising:
   an electrolyte membrane;
   an anode-side electrode comprising an anode-side catalyst layer and an anode-side gas diffusion layer formed on the anode-side catalyst layer, the anode-side electrode being disposed on one side of the electrolyte membrane;
   a cathode-side electrode comprising a cathode-side catalyst layer and a cathode-side gas diffusion layer formed on the cathode-side catalyst layer, the cathode-side electrode being disposed on the other side of the electrolyte membrane;
   an anode-side adhesive layer disposed on at least a part of a periphery of the anode-side catalyst layer on the electrolyte membrane;
   a cathode-side adhesive layer disposed on at least a part of a periphery of the cathode-side catalyst layer on the electrolyte membrane;
   a cathode-side gasket layer disposed in contact with the cathode-side adhesive layer; and
   an anode-side gasket layer disposed in contact with the anode-side adhesive layer,
   wherein a surface-direction end of the anode-side gas diffusion layer is located more on the anode-side gasket layer side than a surface-direction end of the anode-side catalyst layer is, and, further, a surface-direction end of the cathode-side gas diffusion layer is located more on the cathode-side gasket layer side than a surface-direction end of the cathode-side catalyst layer is,
   a surface-direction inner end of the anode-side adhesive layer is located more inside than a surface-direction inner end of the anode-side gasket layer is with respect to a surface direction of the electrolyte membrane-electrode assembly, and further, a part of the anode-side adhesive layer is located to overlap with a part of the anode-side gas diffusion layer with respect to a thickness direction of the electrolyte membrane-electrode assembly, and
   a surface-direction inner end of the cathode-side adhesive layer is located more inside than a surface-direction inner end of the cathode-side gasket layer is with respect to the surface direction of the electrolyte membrane-electrode assembly, and further, a part of the cathode-side adhesive layer is located to overlap with a part of the cathode-side gas diffusion layer with respect to the thickness direction of the electrolyte membrane-electrode assembly.

2. The electrolyte membrane-electrode assembly according to claim 1,
   wherein the surface-direction inner end of the anode-side adhesive layer and the surface-direction inner end of the cathode-side adhesive layer are terminated at positions different with respect to the thickness direction of the electrolyte membrane-electrode assembly.

3. The electrolyte membrane-electrode assembly according to claim 1,
   wherein a size of either of the anode-side catalyst layer and the cathode-side catalyst layer is larger than a size of the other, and
   the surface-direction end of the catalyst layer of which size is smaller is located more inside than the surface-direction end of the other catalyst layer is with respect to the surface direction of the electrolyte membrane-electrode assembly.

4. The electrolyte membrane-electrode assembly according to claim 3,
   wherein the size of the anode-side catalyst layer is larger than the size of the cathode-side catalyst layer, and
   the surface-direction end of the cathode-side catalyst layer is located more inside than the surface-direction end of the anode-side catalyst layer is with respect to the surface direction of the electrolyte membrane-electrode assembly.

5. The electrolyte membrane-electrode assembly according to claim 1,
   wherein the surface-direction inner end of the anode-side adhesive layer and the surface-direction end of the anode-side catalyst layer are in intimate contact with each other, and/or the surface-direction inner end of the cathode-side adhesive layer and the surface-direction end of the cathode-side catalyst layer are in intimate contact with each other.

6. The electrolyte membrane-electrode assembly according to claim 5,
   wherein the surface-direction inner end of the anode-side adhesive layer and the surface-direction end of the anode-side catalyst layer overlap with each other with respect to the thickness direction of the electrolyte membrane-electrode assembly, and/or the surface-direction inner end of the cathode-side adhesive layer and the surface-direction end of the cathode-side catalyst layer overlap with each other with respect to the thickness direction of the electrolyte membrane-electrode assembly.

7. The electrolyte membrane-electrode assembly according to claim 1,
   wherein a size of either of the anode-side gas diffusion layer and the cathode-side gas diffusion layer is larger than a size of the other, and
   the surface-direction end of the gas diffusion layer of which size is smaller is located more inside than the surface-direction end of the other gas diffusion layer is with respect to the surface direction of the electrolyte membrane-electrode assembly.

8. The electrolyte membrane-electrode assembly according to claim 1,
   wherein a thickness of the anode-side catalyst layer and a thickness of the anode-side adhesive layer are substantially equal to each other, and/or a thickness of the cathode-side catalyst layer and a thickness of the cathode-side adhesive layer are substantially equal to each other.

9. The electrolyte membrane-electrode assembly according to claim 1, further comprising:
   an anode-side second gas diffusion layer which is smaller in average pore diameter than the anode-side gas diffusion layer, and is disposed between the anode-side gas diffusion layer and the anode-side catalyst layer, wherein a total thickness of the anode-side catalyst layer and the anode-side second gas diffusion layer and a thickness of the anode-side adhesive layer are substantially equal to each other; and/or
   a cathode-side second gas diffusion layer which is smaller in average pore diameter than the cathode-side gas diffusion layer, and is disposed between the cathode-side gas diffusion layer and the cathode-side catalyst layer, wherein a total thickness of the cathode-side catalyst layer and the cathode-side second gas diffusion layer and a thickness of the cathode-side adhesive layer are substantially equal to each other.

10. The electrolyte membrane-electrode assembly according to claim 1, further comprising:
    a sealing protrusion disposed on at least one of the anode-side gasket layer and the cathode-side gasket layer.

11. A fuel cell, comprising:
the electrolyte membrane-electrode assembly according to claim 1.

12. A method for producing an electrolyte membrane-electrode assembly, comprising:
   (A) forming an anode-side catalyst layer on one side of an electrolyte membrane, and a cathode-side catalyst layer on the other side;
   (B) forming an anode-side adhesive layer and an anode-side gasket layer on at least a part of a periphery of the anode-side catalyst layer on the electrolyte membrane, and a cathode-side adhesive layer and a cathode-side gasket layer on a periphery of the cathode-side catalyst layer on the electrolyte membrane; and
   (C) forming an anode-side gas diffusion layer on the anode-side catalyst layer, and a cathode-side gas diffusion layer on the cathode-side catalyst layer,
   wherein a surface-direction inner end of the anode-side adhesive layer is formed to be located more inside than a surface-direction inner end of the anode-side gasket layer is with respect to a surface direction of the electrolyte membrane, and further, a part of the anode-side adhesive layer is formed to overlap with a part of the anode-side gas diffusion layer with respect to a thickness direction of the electrolyte membrane, and
   a surface-direction inner end of the cathode-side adhesive layer is formed to be located more inside than a surface-direction inner end of the cathode-side gasket layer is with respect to the surface direction of the electrolyte membrane, and further, a part of the cathode-side adhesive layer is formed to overlap with a part of the cathode-side gas diffusion layer with respect to the thickness direction of the electrolyte membrane.

13. The method for producing an electrolyte membrane-electrode assembly according to claim 12,
   wherein hot press is performed for at least one of stacked bodies obtained in the step (A), the step (B), and/or the step (C).

14. The method for producing an electrolyte membrane-electrode assembly according to claim 12, further comprising:
   (D) providing a sealing protrusion on at least one of the anode-side gasket layer and the cathode-side gasket layer.

* * * * *